United States Patent
Wang et al.

(10) Patent No.: US 12,343,823 B2
(45) Date of Patent: Jul. 1, 2025

(54) DIGITIZED VARIABLE-POLARITY WELDING POWER SOURCE BASED ON SiC IGBT

(71) Applicant: South China University of Technology, Guangdong (CN)

(72) Inventors: Zhenmin Wang, Guangdong (CN);
Junhao Wei, Guangdong (CN);
Jianwen Wu, Guangdong (CN)

(73) Assignee: SOUTH CHINA UNIVERSITY OF TECHNOLOGY, Guangdong (CN)

( * ) Notice: Subject to any disclaimer, the term of this patent is extended or adjusted under 35 U.S.C. 154(b) by 826 days.

(21) Appl. No.: 17/588,231

(22) Filed: Jan. 29, 2022

(65) Prior Publication Data

US 2022/0152719 A1    May 19, 2022

Related U.S. Application Data

(63) Continuation of application No. PCT/CN2018/074686, filed on Jan. 31, 2018.

(30) Foreign Application Priority Data

Nov. 30, 2017   (CN) .......................... 201711234792.9

(51) Int. Cl.
 *B23K 9/073*   (2006.01)
 *H02M 1/00*   (2006.01)
  (Continued)

(52) U.S. Cl.
 CPC ............. *B23K 9/073* (2013.01); *H02M 1/007* (2021.05); *H02M 1/32* (2013.01); *H02M 3/33573* (2021.05)

(58) Field of Classification Search
 CPC .... H02M 3/156; H02M 3/335; H02M 3/3353; H02M 3/33561; H02M 3/33573;
  (Continued)

(56) References Cited

U.S. PATENT DOCUMENTS 9,866,135 B2 *    1/2018  Kusama  .............. H02M 7/4807
12,097,577 B2 *   9/2024  Yang  ...................... H02M 1/007
  (Continued)

FOREIGN PATENT DOCUMENTS

CN        1745952 A      3/2006
CN        1750899 A      3/2006
  (Continued)

OTHER PUBLICATIONS

International Search Report of PCT Patent Application No. PCT/CN2018/074686 issued on Aug. 6, 2018.

*Primary Examiner* — Hung D Nguyen
(74) *Attorney, Agent, or Firm* — Michael Fedrick; LOZA & LOZA, LLP (57) ABSTRACT

A digitized variable-polarity welding power source based on SiC IGBT, comprising a main circuit and a control circuit. The main circuit comprises a three-phase rectifying filter circuit, a SiC IGBT primary inverter circuit, a high-frequency transformer, a SiC ultrahigh-frequency rectifying filter output circuit, a SiC IGBT secondary inverter circuit and a high-voltage arc stabilizing circuit which are sequentially connected. The control circuit comprises a controller and a power supply control module, and a digitizing tablet, a SiC primary inverter driving module and a SiC secondary inverter driving module which are in connection with the controller via signals.

10 Claims, 9 Drawing Sheets

(51) Int. Cl.
*H02M 1/32* (2007.01)
*H02M 3/335* (2006.01)

(58) Field of Classification Search
CPC ......... H02M 3/33576; H02M 3/33592; H02M 3/337; H02M 1/0009; H02M 1/0025; H02M 1/0048; H02M 1/0054; H02M 1/007; H02M 1/008; H02M 1/0095; H02M 1/08; H02M 1/084; H02M 1/088; H02M 1/126; H02M 1/14; H02M 1/32; H02M 1/346; H02M 1/348; H02M 1/36; H02M 1/44; H02M 7/003; H02M 7/06; H02M 7/4807; H02M 7/4815; H02M 7/487; H02M 7/53871; H02M 7/797; B23K 9/0671; B23K 9/073; B23K 9/091; B23K 9/092; B23K 9/0953; B23K 9/1043; B23K 9/1075; B23K 9/1093; B23K 9/167; Y02B 70/10
See application file for complete search history.

(56) References Cited

U.S. PATENT DOCUMENTS

| | | |
|---|---|---|
| 2014/0209586 A1 | 7/2014 | Xu et al. |
| 2017/0334011 A1 | 11/2017 | Peters et al. |

FOREIGN PATENT DOCUMENTS

| | | |
|---|---|---|
| CN | 101352776 A | 1/2009 |
| CN | 106392262 A | 2/2017 |
| CN | 207508489 U | 6/2018 |

\* cited by examiner

DIGITIZED VARIABLE-POLARITY WELDING POWER SOURCE BASED ON SiC IGBT

CROSS REFERENCE TO RELATED APPLICATIONS

The present application is a Continuation Application of PCT Application No. PCT/CN2018/074686 filed on Jan. 31, 2018, which claims the benefit of Chinese Patent Application No. 201711234792.9 filed on Nov. 30, 2017. All the above are hereby incorporated by reference in their entirety.

TECHNICAL FIELD

The present invention relates to the technical field of welding power sources, and more specifically, to a digital variable-polarity welding power source based on SiC IGBT.

TECHNICAL BACKGROUND

A variable-polarity welding power source was originally a new type of welding power source invented and developed by NASA for the development of the space shuttle. It is now widely used in aerospace, automobiles, trains, ships and other industrial manufacturing fields. Aluminium, magnesium and their alloys have the advantages of low density, high specific rigidity, strong electromagnetic shielding ability, energy saving and environment friendly etc., and are widely used in the above industrial manufacturing fields. The variable-polarity welding power source has many advantages in the welding of aluminium, magnesium and their alloys, such as deoxidizing films, stirring molten pools, very few pores, reducing tungsten electrode burning loss, and stable welding arc etc. It has obvious advantages over a variety of welding methods and is an ideal power source for welding magnesium, aluminium and their alloys.

At this stage, there are still many problems with variable-polarity welding power sources in the country and abroad. The key problem is that during the welding process, the arc is extinguished and reignited at the moment of changing polarity. Therefore, the arc stabilization circuit of the secondary inverter of the welding power source has become the focus of research. At present, there are two most commonly used secondary inverter arc stabilization methods. One is the full-bridge structure circuit topology stabilization strategy, which adopts the "common conduction" or "common cut-off" method to charge and discharge the output filter inductor and capacitor, and to provide a high-voltage pulse to the arc at the moment of current commutation so that the arc can be ignited again immediately after the arc is extinguished. However, this method is only suitable for small current welding. In high current welding, the excessively high arc stabilizing pulse voltage will cause breakdown and damage of the IGBT of the secondary inverter. The scope of application of this method is limited, and two of the four IGBTs are required to be turned on at the same time. The total switching loss is large. The system is complex and the cost is high. The other method is the half-bridge structure circuit topology stabilization strategy. The current in the output filter inductance of the secondary inverter circuit always decreases during the polarity change process, which slows down the speed of current direction switching when the power source changes polarity, which is not conducive to the stability of the arc.

SUMMARY OF THE INVENTION

The purpose of the present invention is to overcome the shortcomings and deficiencies in the prior art, by providing a digital variable-polarity welding power source based on SiC IGBT, which may solve the problem of instantaneous arc extinguishment and re-ignition with variable polarity, is small size, with high conversion efficiency, and reliable and stable operation.

In order to achieve the above objectives, the present invention is realized through the following technical solutions: a digital variable-polarity welding power source based on SiC IGBT, characterized in that, comprising a main circuit and a control circuit; the main circuit comprises a three-phase rectifying and filtering circuit, a SiC IGBT primary inverter circuit, a high-frequency transformer, a SiC ultra-high-frequency rectifying and filtering output circuit, a SiC IGBT secondary inverter circuit and a high-voltage arc stabilization circuit connected in sequence; wherein the three-phase rectifying and filtering circuit is connected to a three-phase AC power supply, and the high-voltage arc stabilization circuit is connected to a load;

the control circuit comprises a controller and a power supply control module, and a digital panel, a SiC primary inverter drive module, and a SiC secondary inverter drive module connected in signal respectively to the controller; the digital panel, the SiC primary inverter drive module, and the SiC secondary inverter drive module are electrically connected respectively to the power supply control module; the SiC primary inverter drive module is also connected to the SiC IGBT primary inverter circuit; the SiC secondary inverter drive module is also connected with the SiC IGBT secondary inverter circuit.

The three-phase rectifying and filtering circuit is used to rectify and filter the three-phase AC power into a smooth DC; the SiC IGBT primary inverter circuit is used to modulate the DC into a high-voltage, low-current high-frequency AC square wave; the high-frequency transformer is used to isolate the circuits before and after the transformer and modulate a low-voltage, high-current high-frequency AC square wave; the SiC ultra-high-frequency rectifying and filtering output circuit is used to rectify and filter high-frequency AC square waves into DC; the SiC IGBT secondary inverter circuit is used to convert the polarity of the DC output by the SiC ultra-high-frequency rectifying and filtering output circuit to form a variable-polarity current required for welding; the high-voltage arc stabilization circuit is used to provide a reverse high voltage for the arc space when the welding current changes polarity to ensure reliable re-ignition after the arc is extinguished at the instant of the current zero crossing; the SiC primary inverter drive module is used to drive the turn-on and turn-off of the SiC IGBT in the primary inverter circuit in the main circuit to achieve constant current or constant voltage control; the SiC secondary inverter drive module is used to drive the turn-on and turn-off of the SiC IGBT in the secondary inverter circuit in the main circuit to achieve current polarity conversion.

The power device of the variable-polarity welding power supply of the present invention adopts a new generation of SiC IGBT, which makes the switching speed fast, and the switching loss less. The primary inverter frequency can reach more than 100 kHz. The conversion efficiency of the power supply is as high as 93%, and the energy efficiency is about 10% more energy-saving than the existing IGBT welding power supply. At the same time, due to the substantial increase in the inverter frequency, smaller models of the high-frequency transformer and each filter component may be used. The overall volume of the power supply is reduced, and the weight is lighter. By reasonably setting the size and duty cycle of the positive pulse current and negative current, the heat input of the welding arc may be accurately controlled. It avoids the problems of molten pool accommodation, deformation, burn-through, welding spatter etc. which are prone to occur in the welding process of magnesium, aluminium and their alloys. A static reverse high-voltage arc stabilization circuit is added to the main circuit to speed up the electrode switching speed; before the current polarity is switched, the pulse stabilizing arc current is superimposed to increase the ionization degree of the arc space to make it easier to ignite after the arc is extinguished.

Preferably, the three-phase rectifying and filtering circuit comprises a three-phase rectifier module BR101 and an LC filter module connected in phase; the SiC IGBT primary inverter circuit comprises a SiC IGBT module TR101, a SiC IGBT module TR102 and an RC absorption protection circuit; the SiC ultra-high-frequency rectifying and filtering output circuit comprises a SiC diode D101, a SiC diode D102, a SiC diode D103, a SiC diode D104 and a filter protection circuit; the SiC diode D102 and the SiC diode D104 are connected in series and then connected in parallel to a series circuit comprises the SiC diode D101 and the SiC diode D103; the SiC IGBT secondary inverter circuit comprises a SiC IGBT module TR103, a SiC IGBT module TR104 and an RCD absorption protection circuit; the high-voltage arc stabilization circuit comprises a diode D105, a diode D108, a tube-shaped ceramic resistor R117, an output filtering inductor L102, and a high-frequency coupling inductor T102;

the SiC IGBT module TR101 and the SiC IGBT module TR102 are connected respectively in parallel to the LC filter module; a primary of the high-frequency transformer is connected respectively to the SiC IGBT module TR101 and the SiC IGBT module TR102, and a first secondary output terminal of the high-frequency transformer is connected to a connection point of the SiC diode D101 and the SiC diode D103, and a third secondary output terminal of the high-frequency transformer is connected to a connection point of the SiC diode D102 and the SiC diode D104;

the SiC IGBT module TR103 and the SiC IGBT module TR104 are connected respectively in parallel to the series circuit comprises the SiC diode D101 and the SiC diode D103; the SiC IGBT module TR103 is also connected to the high-frequency coupling inductance T102 through the diode D105, the diode D108, the tube-shaped ceramic resistor R117 and the output filtering inductance L102 connected in sequence; the second secondary output terminal of the high frequency transformer is connected to a connection point of the tubular ceramic resistor R117 and the output filtering inductance L102; the SiC IGBT module TR103 is connected to a positive pole of the load; the high-frequency coupling inductor T102 is connected to a negative pole of the load; an output bypass filter circuit is also connected between the connection point of the tubular ceramic resistor R117 and the output filter inductance L102 and the positive pole of the load;

the SiC IGBT module TR101 and the SiC IGBT module TR102 are connected respectively to the SiC primary inverter drive module; the SiC IGBT module TR103 and the SiC IGBT module TR104 are connected respectively to the SiC secondary inverter drive module.

The operating principle of the digital variable-polarity welding power source of the present invention is: the three-phase AC power source is converted into a DC through a three-phase rectifying and filtering circuit, and converted into a high-frequency, high-current and low-voltage AC square wave above 100 kHz through a SiC IGBT primary inverter circuit. After rectification and filtering by the SiC ultra-high-frequency rectify filter circuit into DC, the high-frequency transformer converts the high-frequency and high-voltage AC square wave into a high-frequency and high-current AC square wave. Finally, the transmission direction of the smooth DC is switched by the SiC IGBT secondary inverter circuit to achieve the purpose of changing the polarity of the current; the high-voltage arc stabilization circuit rectifies and filters the high-voltage AC to generate high-voltage DC through the tubular ceramic resistor and loads it on the negative electrode of the load. When the current changes from positive to negative, a reverse high voltage is provided to the electric arc space to stabilize the arc. The high-voltage arc stabilizing circuit may avoid the introduction of high-voltage and high-frequency interference, and ensure the reliability of the power supply; therefore, the variable-polarity welding power supply of the present invention may achieve the processing effects of arc stability, near zero spatter, and high-quality welds.

Preferably, the SiC primary inverter drive module comprises a first push-pull output circuit comprises a resistor R201, a resistor R202, a P-channel power field effect tube M201, and an N-channel power FET M202, a second push-pull output circuit comprises a resistor 203, a resistor R204, a P-channel power FET M203 and N-channel power FET 204, and a high-frequency pulse transformer T201, a high-frequency pulse transformer T202, and a four-way drive signal generating circuit.

Preferably, the SiC secondary inverter drive module comprises an optocoupler U301, an optocoupler U302, a Zener diode D301, and a Zener diode D302, a gate drive resistor R302, a gate drive resistor R305, a varistor R303 and a varistor R306.

Preferably, the power supply control module comprises a wave filtering and surge limiting unit, a rectifying and filtering unit, a flyback converter and a number of voltage stabilization modules connected in sequence, and a drive unit connected to the flyback converter.

Preferably, a current feedback module used to sample and feedback an output welding current to the controller for a PID adjustment to complete a constant current output control;

a voltage feedback module used to sample and feedback an output welding voltage to the controller for a PID adjustment to complete a constant voltage output control;

a switch module used to output a switch signal generated by the controller;

an anomaly detection and protection circuit used to monitor and determine a working state of the welding power source in real-time and to protect;

a digital panel connected to the controller through a CAN communication interface used to complete a real-time display of a welding parameter setting and welding current and voltage;

the current feedback module, the voltage feedback module, and the switch module are connected respectively to the controller; the controller is used to generate a digital PWM signal by comparing welding parameters set by the digital panel with current and voltage values provided by the current feedback module and the voltage feedback module.

Preferably, the abnormality detection protection circuit comprises an overcurrent protection circuit, an under-voltage and over-voltage protection circuit.

Preferably, the overcurrent protection circuit comprises a rectifier D401, a rectifier D402, a rectifier D403, a rectifier D404, a resistor R401, a capacitor C401, and a comparator U401, a high-speed optocoupler U402, an optocoupler U403 and an optocoupler U404.

Preferably, the under-voltage and over-voltage protection circuit comprises a voltage dividing circuit comprises a voltage dividing resistor R501, a voltage dividing resistor R502, a voltage dividing resistor R503, and a voltage dividing resistor R504, and a comparator U501.

Preferably, the controller comprises a high-performance DSC microprocessor based on an ARM Cortex-M4 core.

Compared with the prior art, the present invention has the following advantages and beneficial effects:

1. The welding power supply has good performance and high safety: the present invention uses a high-performance DSC microprocessor based on the ARM Cortex-M4 core, which is equipped with a dedicated DSP instruction and a floating point unit (FPU). The data processing speed is up to 210 DMIPS. The whole machine has more excellent dynamic characteristics, which may realize segmented and hierarchical fine designs and real-time controls of the welding arc, and real-time monitoring and feedback of the welding power supply status;

2. Higher energy utilization rate, energy saving and environment friendly, with good processing effect: all power devices of the present invention adopt a new generation of SiC IGBT, which makes the switching speed fast, and the switching loss less. The primary inverter frequency can reach more than 100 kHz. The conversion efficiency of the power supply is as high as 93%, and the energy efficiency is about 10% more energy-saving than the existing IGBT welding power supply. At the same time, due to the substantial increase in the inverter frequency, smaller models of the high-frequency transformer and each filter component may be used. The overall volume of the power supply is reduced, and the weight is lighter. By reasonably setting the size and duty cycle of the positive pulse current and negative current, the heat input of the welding arc may be accurately controlled. It avoids the problems of molten pool accommodation, deformation, burn-through, welding spatter etc. which are prone to occur in the welding process of magnesium, aluminium and their alloys;

3. Good electric arc stability: a static reverse high-voltage arc stabilization circuit is added to the main circuit to speed up the electrode switching speed; before switching the current polarity, pulse stabilizing current is superimposed to increase the electric arc space ionization degree, making the electric arc easier to ignite after the it is extinguished; it may be used not only for aluminium alloy welding, but also for high-performance welding of titanium alloys, magnesium alloys and other alloy materials;

4. Higher reliability: The power device of the present invention is a new generation of SiC IGBT, which has better thermal tolerance, voltage resistance and high frequency resistance than ordinary IGBT power devices. It adapts to large current output, and may also be used for low current welding. At higher operating frequencies, higher power consumption generates more self-heating, resulting in higher operating junction temperature (about 225° C.), and the power handling capability and switching frequency capability of SiC IGBTs are improved. The band gap is wide. There is no reverse recovery effect in the switching process of the device, and the reliability is easier to be guaranteed.

DETAILED DESCRIPTION

The present invention will be further described in detail below in conjunction with the drawings and specific embodiments.

Embodiments

Figure 1:
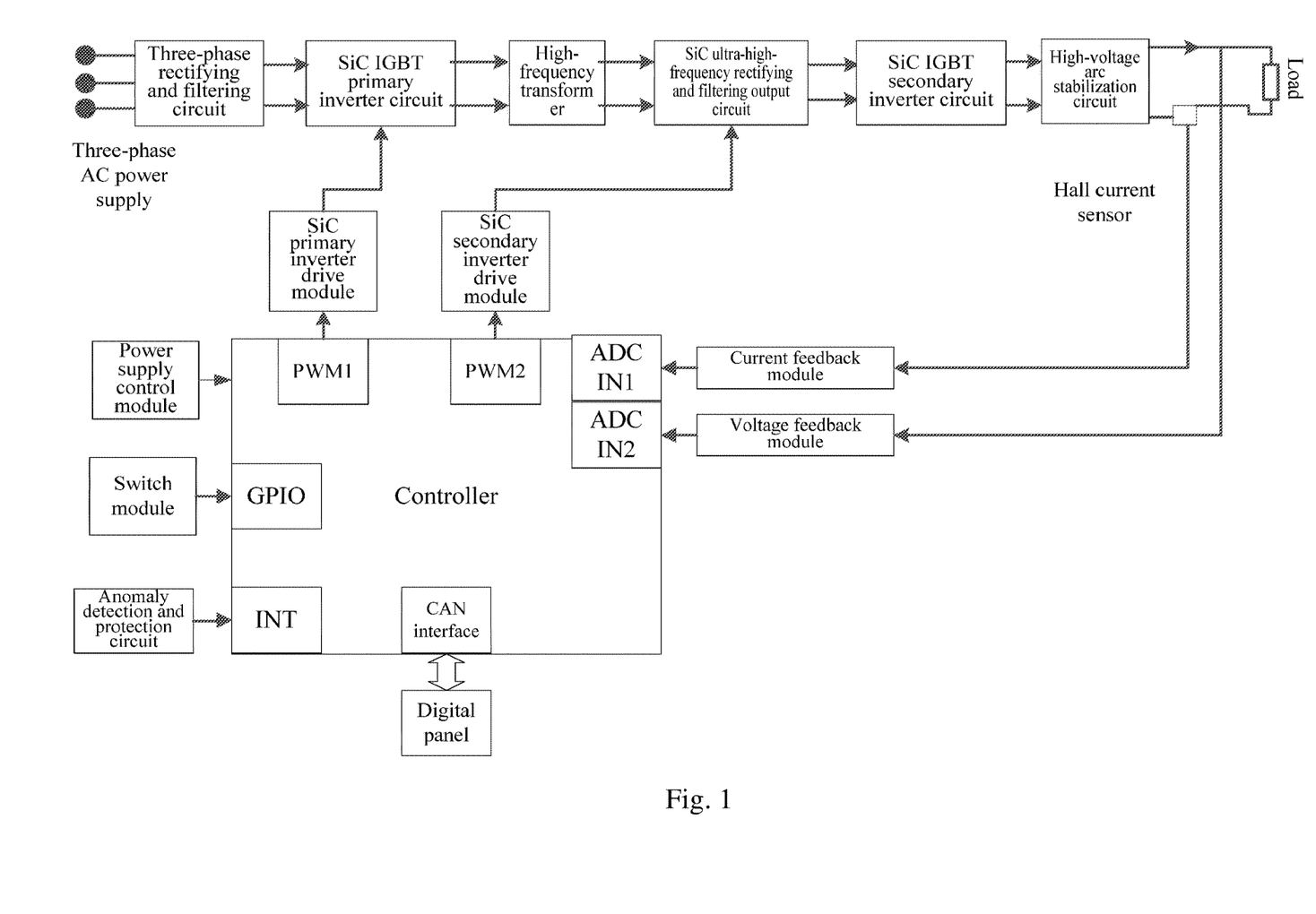
FIG. 1 is a structural diagram of a variable-polarity welding power source of the present invention.

As shown in FIGS. 1 to 9, a digital variable-polarity welding power source based on SiC IGBT in this embodiment comprises a main circuit and a control circuit; the main circuit comprises a three-phase rectifying and filtering circuit, a SiC IGBT primary inverter circuit, a high-frequency transformer, a SiC ultra-high-frequency rectifying and filtering output circuit, a SiC IGBT secondary inverter circuit and a high-voltage arc stabilization circuit connected in sequence; wherein the three-phase rectifying and filtering circuit is connected to a three-phase AC power supply, and the high-voltage arc stabilization circuit is connected to a load;

the control circuit comprises a controller and a power supply control module, and a digital panel, a SiC primary inverter drive module, and a SiC secondary inverter drive module connected in signal respectively to the controller; the digital panel, the SiC primary inverter drive module, and the SiC secondary inverter drive module are electrically connected respectively to the power supply control module; the SiC primary inverter drive module is also connected to the SiC IGBT primary inverter circuit; the SiC secondary inverter drive module is also connected with the SiC IGBT secondary inverter circuit.

The three-phase rectifier filter circuit is used to rectify and filter the three-phase AC power into a smooth DC power; the SiC IGBT primary inverter circuit is used to modulate the DC power into a high-voltage, low-current high-frequency AC square wave; a high-frequency transformer is used to isolate the circuit before and after the transformer And modulate a low-voltage, high-current high-frequency AC square wave; SiC ultra-high-frequency rectifier filter output circuit is used to rectify and filter high-frequency AC square waves into direct current; SiC IGBT secondary inverter circuit is used to convert SiC ultra-high frequency The polarity of the direct current output by the rectifying and filtering output circuit is used to form the polarity-changing current required for welding; the high-voltage arc stabilizing circuit is used to provide a reverse high voltage for the arc space when the welding current changes polarity to ensure that the current zero-crossing point is instantaneously after the arc is extinguished Reliable re-ignition; SiC primary inverter drive module is used to drive the turn-on and turn-off of SiC IGBT in the primary inverter circuit in the main circuit to achieve constant current or constant voltage control; SiC secondary inverter drive module is used to drive the main circuit The turn-on and turn-off of the SiC IGBT in the secondary inverter circuit in the secondary inverter circuit realizes the current polarity change.

A preferred solution is: the control circuit also comprises: a current feedback module used to sample and feedback an output welding current to the controller for a PID adjustment to complete a constant current output control; a voltage feedback module used to sample and feedback an output welding voltage to the controller for a PID adjustment to complete a constant voltage output control; a switch module used to output a switch signal generated by the controller; an anomaly detection and protection circuit used to monitor and determine a working state of the welding power source in real-time and to protect; a digital panel connected to the controller through a CAN communication interface used to complete a real-time display of a welding parameter setting and welding current and voltage; the current feedback module, the voltage feedback module, and the switch module are connected respectively to the controller; the controller is used to generate a digital PWM signal by comparing welding parameters set by the digital panel with current and voltage values provided by the current feedback module and the voltage feedback module.

The variable-polarity welding power source of the present invention may be used for DC constant voltage welding, and may also be used for single pulse, dual pulse, median pulse and other arbitrary waveform variable-polarity pulse TIG or MIG welding.

Figure 2:
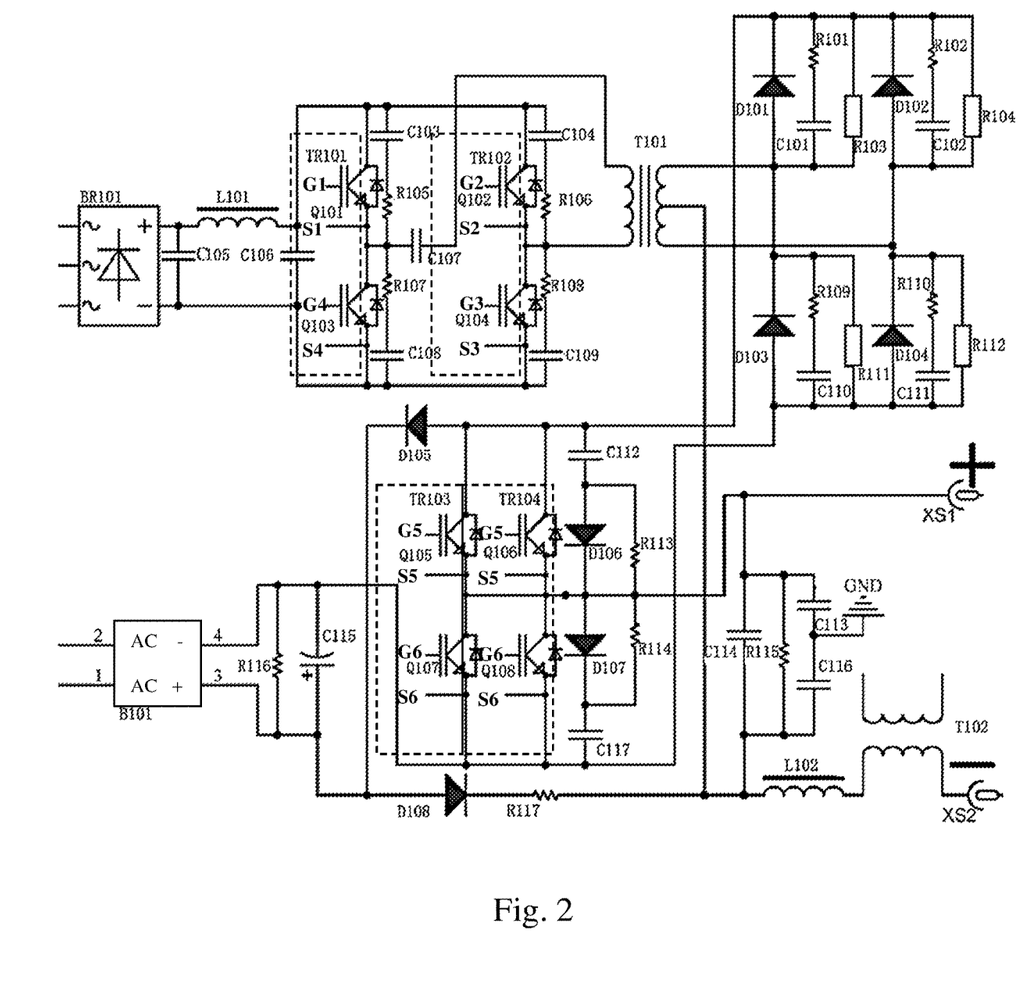
FIG. 2 is an equivalent topology diagram of a main circuit of the variable-polarity welding power supply of the present invention.

A specific structure of the main circuit is: the three-phase rectifying and filtering circuit comprises a three-phase rectifier module BR101 and an LC filter module connected in phase; the SiC IGBT primary inverter circuit comprises a SiC IGBT module TR101, a SiC IGBT module TR102 and an RC absorption protection circuit; the SiC ultra-high-frequency rectifying and filtering output circuit comprises a SiC diode D101, a SiC diode D102, a SiC diode D103, a SiC diode D104 and a filter protection circuit; the SiC diode D102 and the SiC diode D104 are connected in series and then connected in parallel to a series circuit comprises the SiC diode D101 and the SiC diode D103; the SiC IGBT secondary inverter circuit comprises a SiC IGBT module TR103, a SiC IGBT module TR104 and an RCD absorption protection circuit; the high-voltage arc stabilization circuit comprises a diode D105, a diode D108, a tube-shaped ceramic resistor R117, an output filtering inductor L102, and a high-frequency coupling inductor T102;

the SiC IGBT module TR101 and the SiC IGBT module TR102 are connected respectively in parallel to the LC filter module; a primary of the high-frequency transformer is connected respectively to the SiC IGBT module TR101 and the SiC IGBT module TR102, and a first secondary output terminal of the high-frequency transformer is connected to a connection point of the SiC diode D101 and the SiC diode D103, and a third secondary output terminal of the high-frequency transformer is connected to a connection point of the SiC diode D102 and the SiC diode D104;

the SiC IGBT module TR103 and the SiC IGBT module TR104 are connected respectively in parallel to the series circuit comprises the SiC diode D101 and the SiC diode D103; the SiC IGBT module TR103 is also connected to the high-frequency coupling inductance T102 through the diode D105, the diode D108, the tube-shaped ceramic resistor R117 and the output filtering inductance L102 connected in sequence; the second secondary output terminal of the high frequency transformer is connected to a connection point of the tubular ceramic resistor R117 and the output filtering inductance L102; the SiC IGBT module TR103 is connected to a positive pole of the load; the high-frequency coupling inductor T102 is connected to a negative pole of the load; an output bypass filter circuit is also connected between the connection point of the tubular ceramic resistor R117 and the output filter inductance L102 and the positive pole of the load; the output bypass filter circuit comprises a resistor R115, a capacitor C113, a capacitor C114 and a capacitor C116;

the SiC IGBT module TR101 and the SiC IGBT module TR102 are connected respectively to the SiC primary inverter drive module; the SiC IGBT module TR103 and the SiC IGBT module TR104 are connected respectively to the SiC secondary inverter drive module.

The operating principle of the main circuit is: the three-phase AC is converted into a DC through a three-phase rectifying and filtering circuit, and converted into a high-frequency, high-current and low-voltage AC square wave above 100 kHz through a SiC IGBT primary inverter circuit. After rectification and filtering by the SiC ultra-high-frequency rectify filter circuit into DC, the high-frequency transformer converts the high-frequency and high-voltage AC square wave into a high-frequency and high-current AC square wave. Finally, the transmission direction of the smooth DC is switched by the SiC IGBT secondary inverter circuit to achieve the purpose of changing the polarity of the current; when the welding current is positive, the positive terminals Q105 and Q106 of the SiC IGBT module TR103 and SiC IGBT module TR104 are turned on, and the negative terminals Q107 and Q108 of the SiC IGBT module TR103 and SiC IGBT module TR104 are disconnected. The current flowing through the tube-shaped ceramic power resistor R117 is zero. At this time, the arc stabilization high voltage has no effect on the electric arc space; when the current turns from positive to negative, the positive terminals Q105 and Q106 of the SiC IGBT module TR103 and SiC IGBT module TR104 are disconnected, and the negative terminals Q107 and Q108 of the SiC IGBT module TR103 and SiC IGBT module TR104 are turned on. The electric arc is extinguished. The power supply has no-load, and the high-voltage arc stabilization circuit forms a loop, which acts to give a high-voltage pulse to the electric arc space to prompt the electric arc to reignite; when the arc is reignited, the tubular ceramic power resistor R117 is short-circuited by the electric arc, and the current flowing through the tubular ceramic power resistor R117 is almost zero, and the arc stabilizing high voltage has no effect on the electric arc space. The high-voltage arc stabilization circuit rectifies and filters the high-voltage AC to generate high-voltage DC through the tubular ceramic resistor to load the negative pole of the load. When the current changes from positive to negative, it will give the electric arc space a reverse high voltage to stabilize the arc.

A further preferred solution is: the main circuit further comprises an RC rectifying output filtering circuit comprises a rectifier module B101, a resistor R116 and a capacitor C115; the input end of the rectifier module B101 is connected to a three-phase/single-phase AC power supply.

Figure 9:
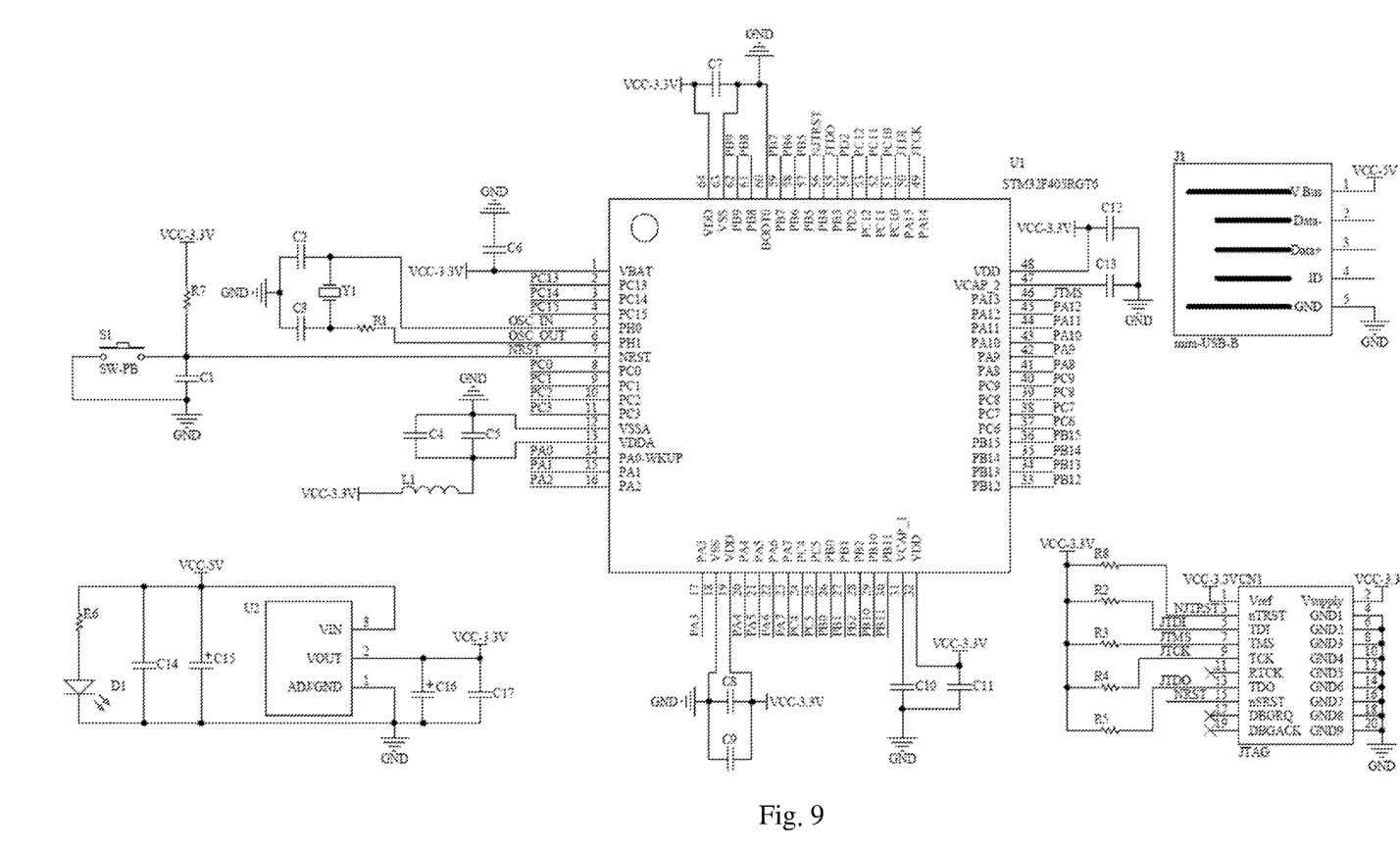
FIG. 9 is a schematic diagram of a circuit of the controller of the variable-polarity welding power source of the present invention.

The controller comprise a high-performance DSC microprocessor based on the ARM Cortex-M4 core; for example, the DSC-level ARM chip STM32F405RGT6 with a working frequency of 168 M. The controller also comprises a low-dropout linear regulated power supply module comprises AMS1117 (U2) and its peripheral circuits, an external clock circuit comprises Y1, C1 to C2, and R1, an external reset circuit comprises S1, C1, and R7, and a JTAG debugging circuit comprises R2 to R5, R8 and CN1. The DSC microprocessor may generate a digital PWM signal with flexible adjustable multi-channel pulse width, duty cycle, dead time and phase according to the working sequence and logical relationship of the power switch tube; the DSC microprocessor embeds the corresponding current-voltage double closed-loop control algorithm, which may realize functions such as constant voltage, constant current, variable slope characteristics, multi-step characteristic control, multi-section energy control, and variable polarity control.

Figure 3:
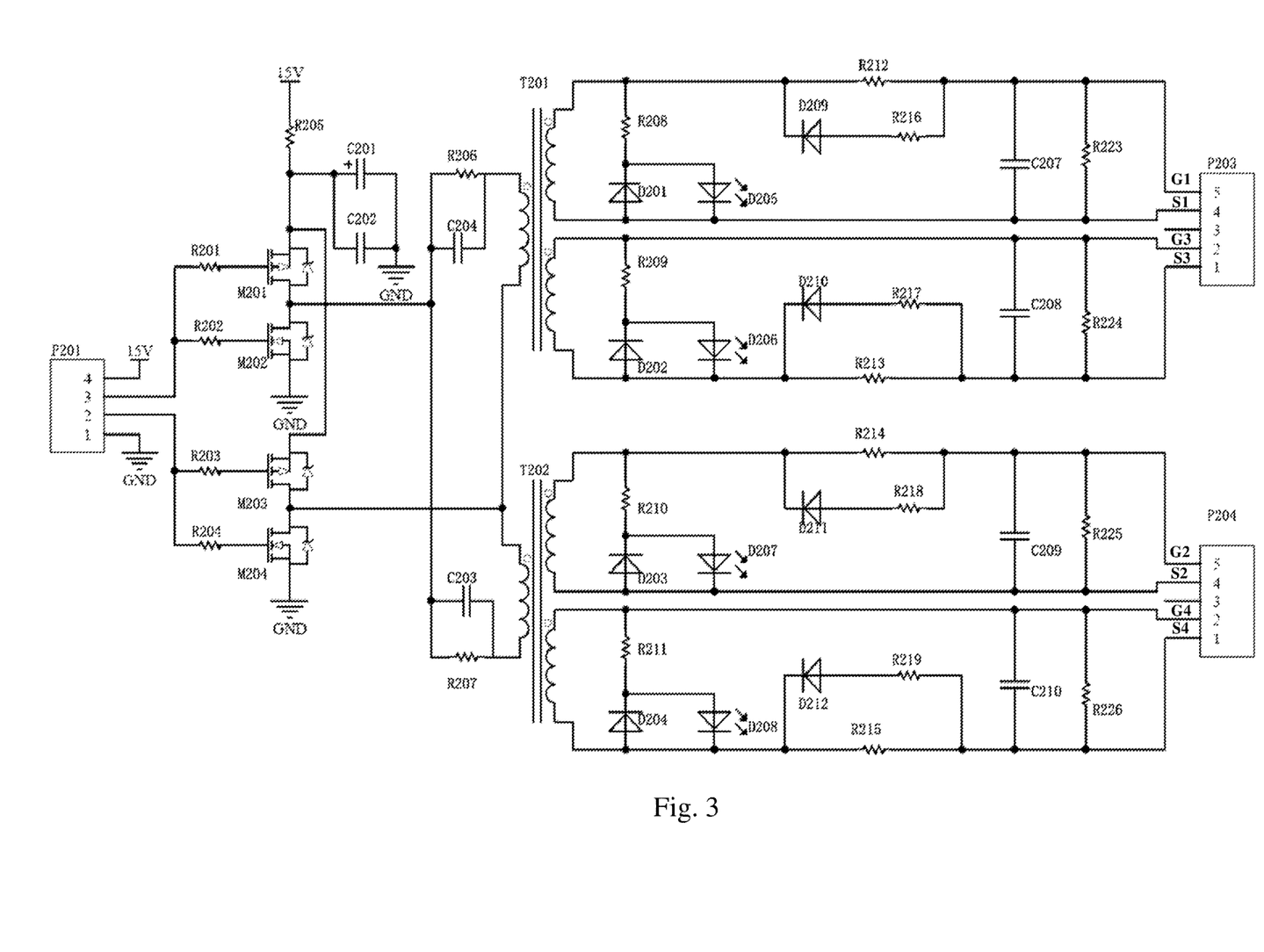
FIG. 3 is a schematic diagram of a SiC primary inverter drive module of the variable-polarity welding power source of the present invention.

A specific structure of the SiC primary inverter drive module is: comprises a first push-pull output circuit comprises a resistor R201, a resistor R202, a P-channel power field effect tube M201, and an N-channel power FET M202, a second push-pull output circuit comprises a resistor 203, a resistor R204, a P-channel power FET M203 and N-channel power FET 204, and a high-frequency pulse transformer T201, a high-frequency pulse transformer T202, and a four-way drive signal generating circuit. Since the working current of the power devices of the SiC IGBT primary inverter circuit is relatively small and the operating frequency is relatively high, the SiC primary inverter drive module adopts a high-frequency pulse transformer isolated drive circuit. The TTL-type PWM drive signal generated by the controller is isolated by a high-speed linear optocoupler device and then input to the P-channel power FET M201, N-channel power FET 202, P-channel power FET M203 and N-channel power FET 204 respectively. The output signals are amplified and isolated by high-frequency pulse transformers T201 and T202 to generate four IGBT drive signals to drive the corresponding SiC IGBT modules.

Figure 4:
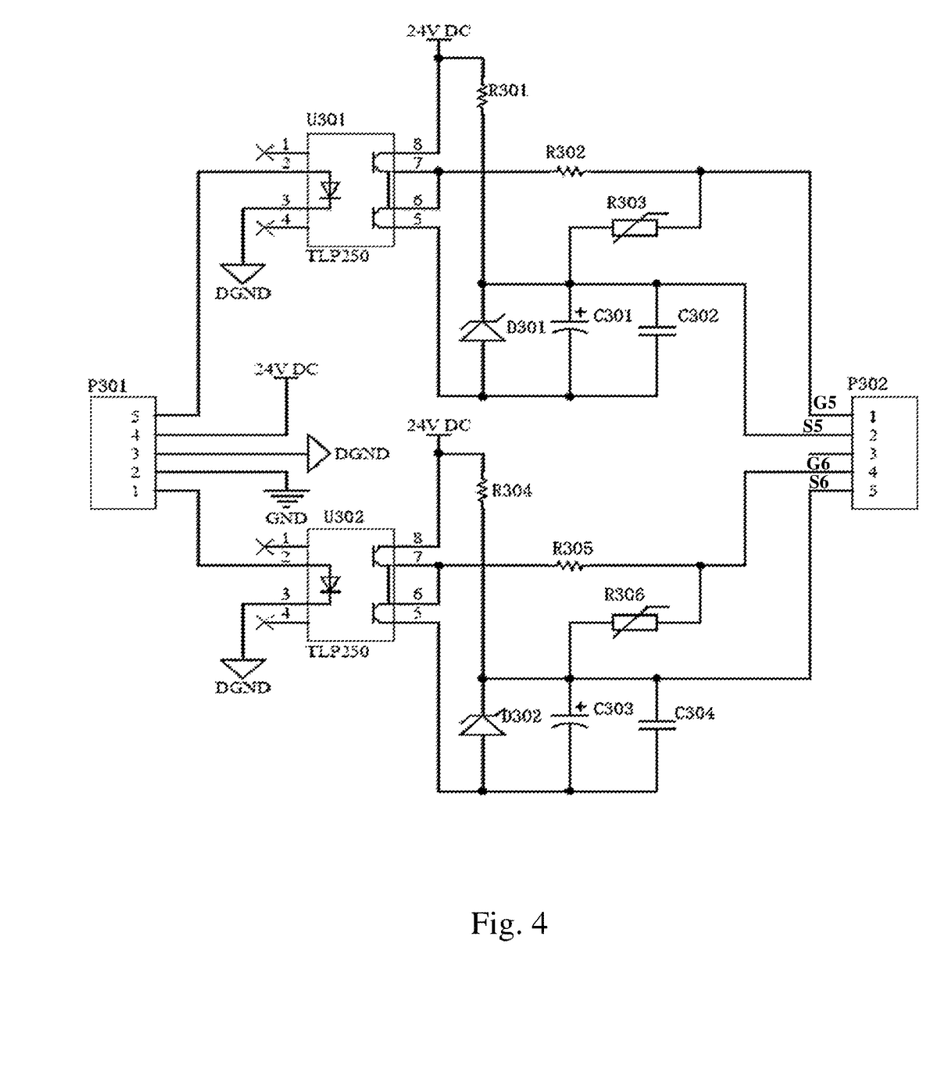
FIG. 4 is a schematic diagram of a SiC secondary inverter drive module of the variable-polarity welding power source of the present invention.

A specific structure of the SiC secondary inverter drive module is: comprises an optocoupler U301, an optocoupler U302, a Zener diode D301, and a Zener diode D302, a gate drive resistor R302, a gate drive resistor R305, a varistor R303 and a varistor R306. The SiC secondary inverter drive module adopts an optocoupler isolated drive circuit. The TTL-type PWM drive signal generated by the controller is isolated by the high-speed linear optocoupler device and then input to the optocouplers U130 and U302 respectively to generate two complementary PWM signals to drive the SiC IGBT module of the dual half-bridge SiC IGBT secondary inverter circuit, wherein the Zener diodes D301 and D302 provide a negative bias when the IGBT is turned off to ensure a fast and reliable turn off of the SiC IGBT module. Varistors R303 and R306 provide bypass channels for interfering voltage spikes and provide reliable protection for SiC IGBT modules.

Figure 5:
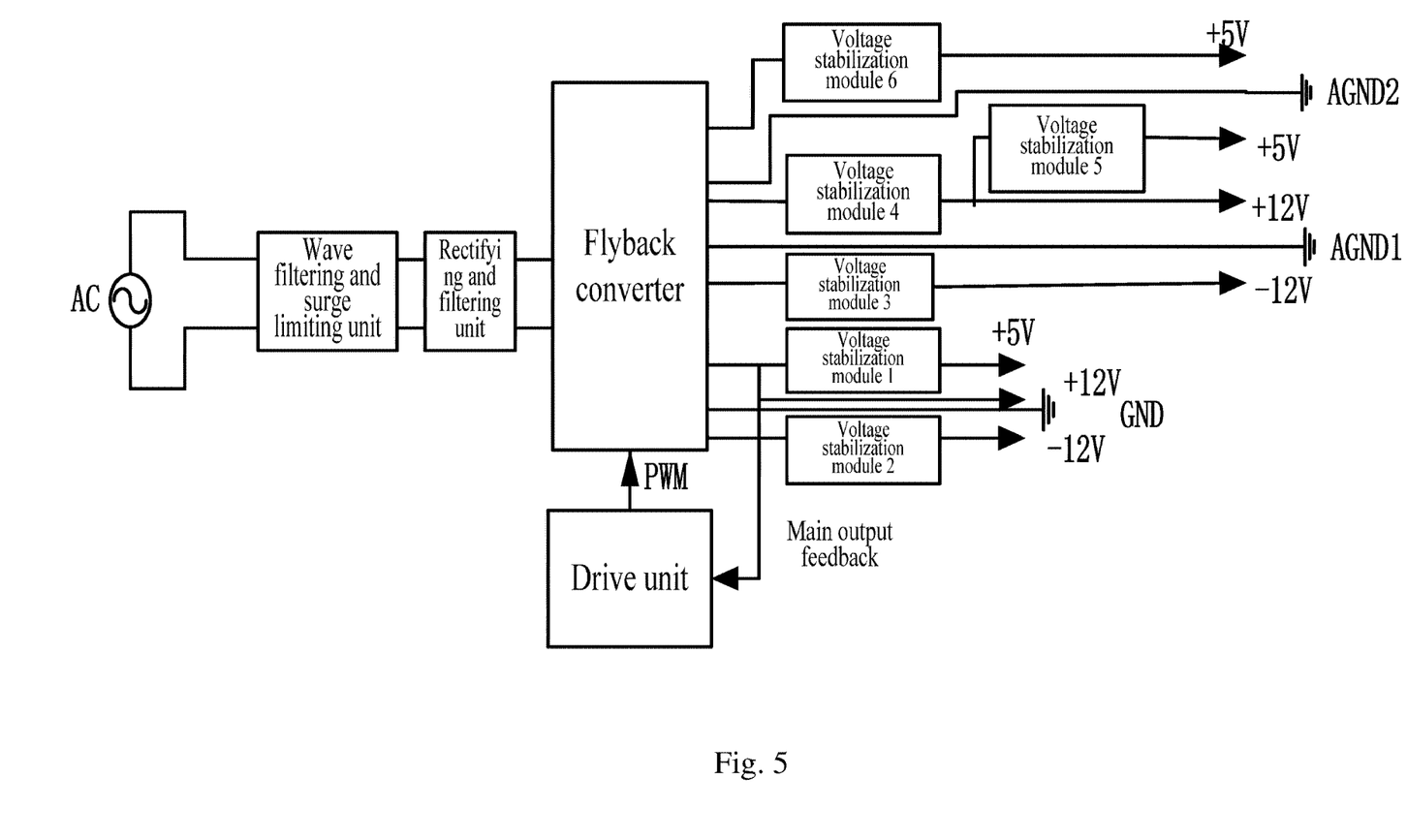
FIG. 5 is a structural block diagram of a power supply control module of the variable-polarity welding power supply of the present invention.

A specific structure of the power supply control module is: comprises a wave filtering and surge limiting unit, a rectifying and filtering unit, a flyback converter and a number of voltage stabilization modules connected in sequence, and a drive unit connected to the flyback converter. The power supply control module may stably realize two-channel +12V, two-channel −12V and three-channel +5V DC output within a wide range of input voltage changes. It has good adaptability to network voltage fluctuations and further improves the reliability of the control system.

Figure 6:
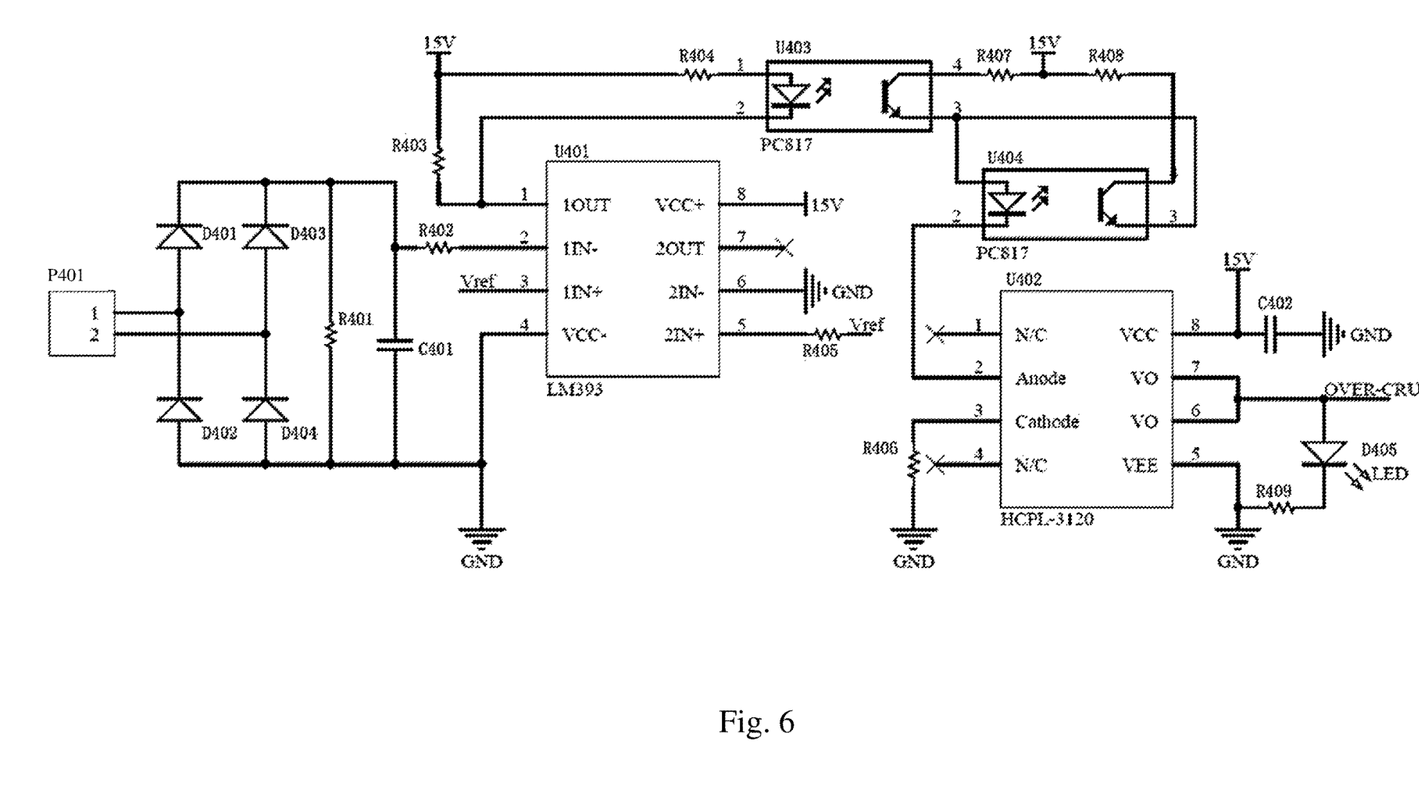
FIG. 6 is a schematic diagram of an overcurrent protection circuit of the variable-polarity welding power supply of the present invention.
Figure 7:
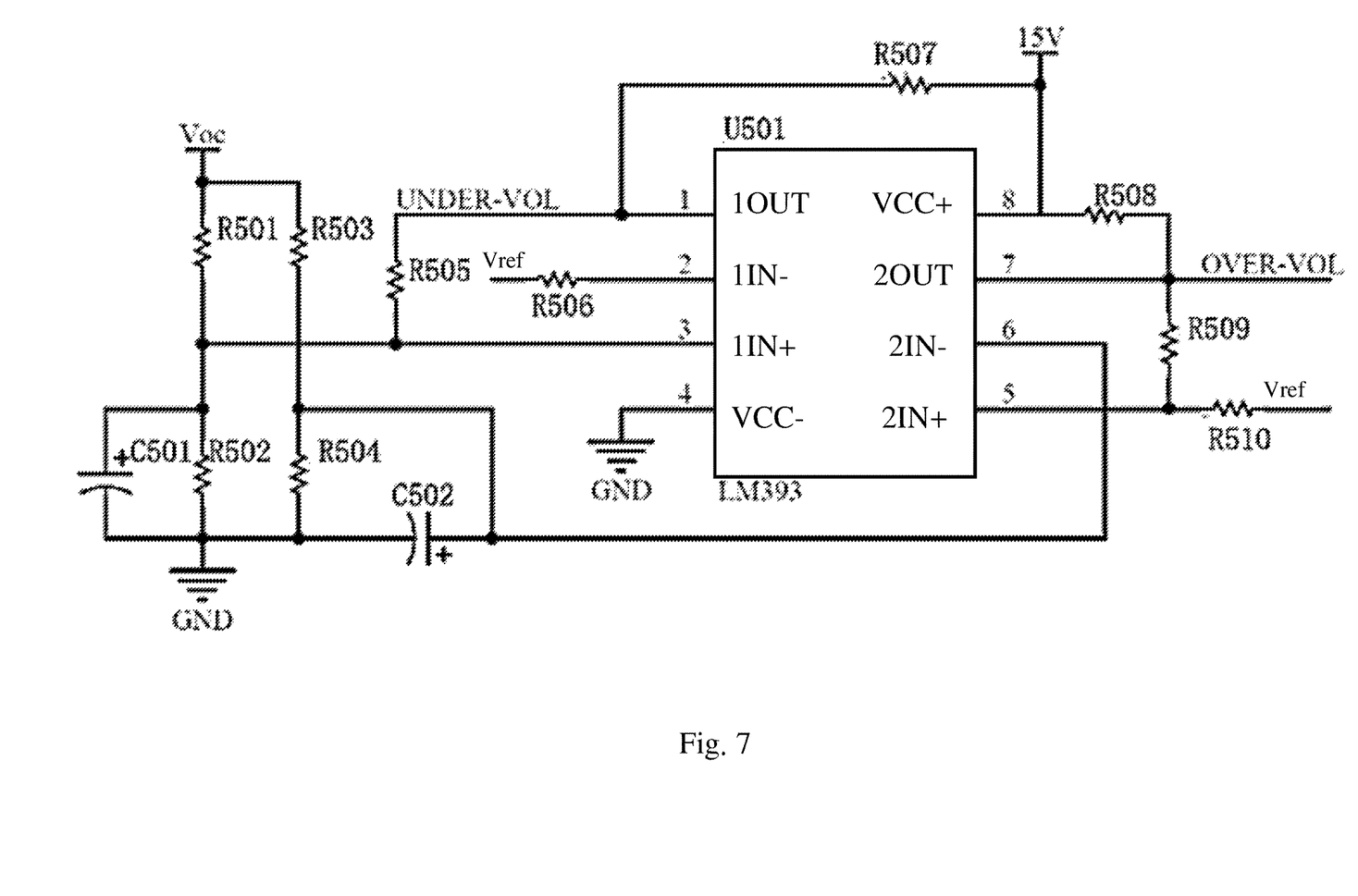
FIG. 7 is a schematic diagram of an under-voltage and over-voltage protection circuit of the variable-polarity welding power supply of the present invention.

A preferred solution is: the anomaly detection and protection circuit comprises an overcurrent protection circuit and an under-voltage and over-voltage protection circuit.

The overcurrent protection circuit comprises rectifier D401, rectifier D402, rectifier D403, rectifier D404, resistor R401, capacitor C401, comparator U401, high-speed optocoupler U402, optocoupler U403, and optocoupler U404. The overcurrent protection circuit conducts non-contact detection and sampling of the primary current of the high-frequency transformer through the AC mutual induction coil, and converts the large current into a small current signal according to the current conversion ratio of 200 A:1 A. After passing through a rectifier circuit and sampling resistor R402, it is converted into a proportional DC voltage signal $V_f$, and input to the inverting input terminal of the comparator U401. $V_{ref}$ is the reference voltage. When the overcurrent phenomenon occurs, $V_f > V_{ref}$, the comparator U401 outputs a low level, resulting the optocoupler U403 and the optocoupler U404 forming a self-locking circuit. At the same time, the high-speed optocoupler U402 outputs a high level, which generates and transmits an overcurrent protection signal to the controller to perform corresponding protection actions. The over-current fault LED indicator D405 lights up, indicating that the welding power source has an IGBT over-current phenomenon.

The under-voltage and over-voltage protection circuit comprises a voltage divider circuit comprises a voltage dividing resistor R501, a voltage dividing resistor R502, a voltage dividing resistor R503, and a voltage dividing resistor R504, and a comparator U501. Voc is the DC sampling voltage after the grid voltage is reduced by transformer, rectified and filtered. It is proportionally reduced to different voltage values through a resistor divider network comprises voltage divider resistors R501 to R504, and then input to inverting and non-inverting input terminals of two comparators U501, for comparison with the reference voltage $V_{ref}$. When the resistor divider value is greater than $V_{ref}$, a comparator U501 outputs a low-level signal, and it is considered that an over-voltage fault has occurred at this time; when the resistance of the other path is less than $V_{ref}$, the other comparator U501 outputs a high-level signal, and it is considered that an under-voltage fault has occurred at this time. The fault indication signal is transmitted to the inside of the chip to trigger the welding torch to turn off, thereby realizing the protection of the welding power supply.

Figure 8:
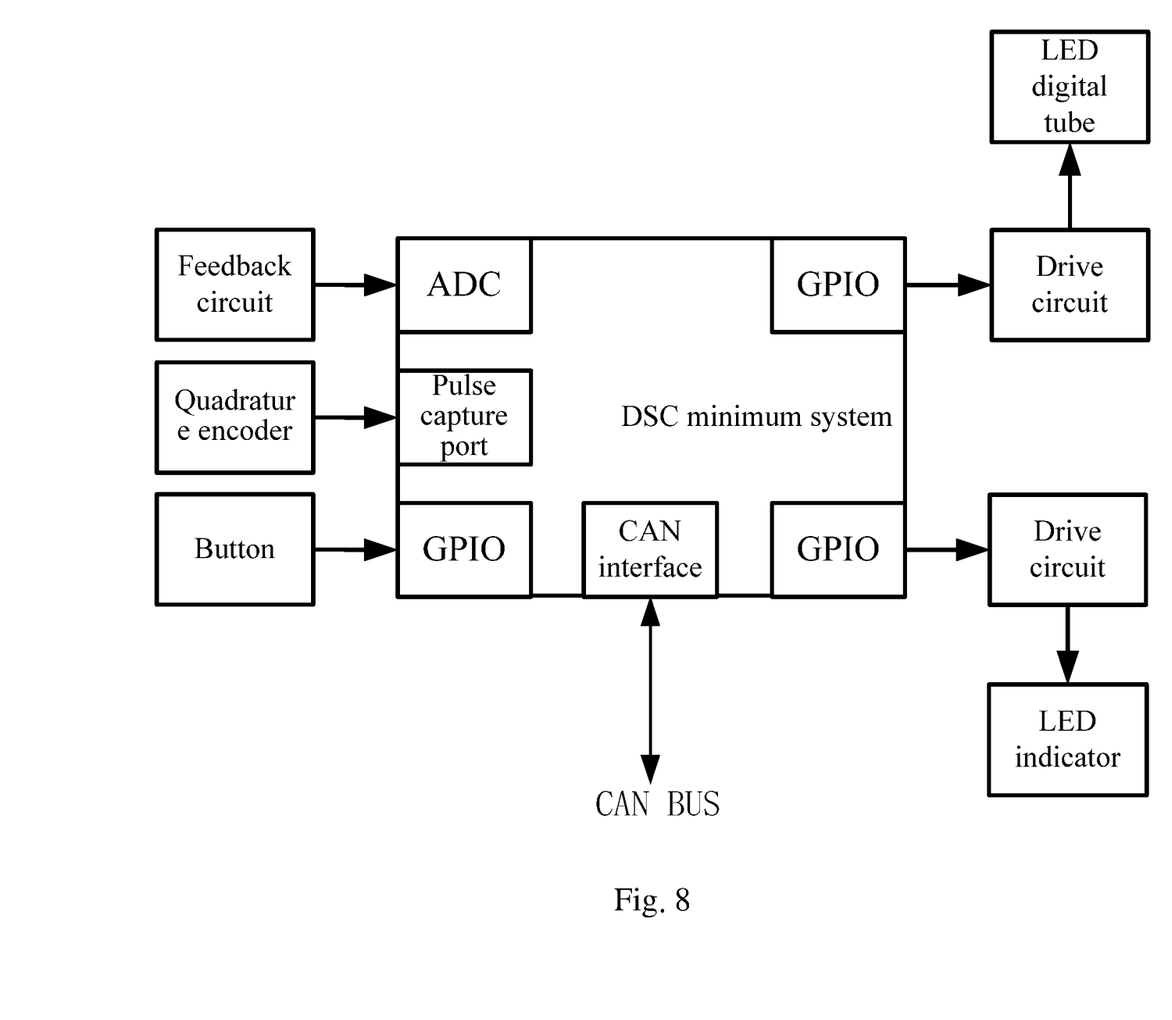
FIG. 8 is a structural diagram of a digital panel of the variable-polarity welding power source of the present invention.

The digital panel may be a segment display+digital button mode panel, or an industrial control touch screen system. Here, the man-machine interaction panel is introduced in the mode of segment display+digital button. It mainly comprises a DSC minimum system, a feedback circuit, a quadrature encoder, buttons, an LED segment display, a driving circuit, an LED indicator etc.; the buttons, the LED, the segment display are connected with a GPIO module of DSC minimum system. Both LED and segment display driving circuit use 74HC595 and ULN2003 to expand the IO port and amplify the current of the LED and segment display to ensure sufficient display brightness; the digital panel completes welding parameter setting, real-time acquisition, detection and display of welding current and voltage, and information data sharing and digital control through CAN BUS network and welding power supply.

The basic principle of the inventive design of the present invention is: adopting all-digital control technology and high-power SiC IGBT high-frequency switching inverter technology to construct a high-performance all-digital variable-polarity welding power supply with high-voltage arc stabilization function; using a digital panel to achieve precise human-computer interaction through the CAN communication interface. On this basis, a variety of current and voltage waveform precision control strategies are adopted to accurately control the welding electric arc heat input and the superimposed pulse current output required for arc stabilization, so as to create a variable-polarity welding power source that is small in size, light in weight, stable in electric arc, good in weld quality, energy-saving and environment friendly.

The working principle of the present invention is: a three-phase AC is rectified and filtered by a full bridge to form a DC, and converted into a high-frequency, high-current and low-voltage AC square wave above 100 kHz through a SiC IGBT primary inverter circuit. After rectification and filtering by the SiC ultra-high-frequency rectify filter circuit into DC, finally, the current polarity is switched by the SiC IGBT secondary inverter circuit, and the welding current with variable polarity is output; the current feedback module and voltage feedback module are mainly used to detect the current value and voltage value output by the welding power source in real time, and to provide them to the controller; the digital panel mainly realizes the human-computer interaction functions such as the preset of process parameters and the status display etc.; the controller mainly generates a suitable digital PWM signal based on the preset value of the digital panel and the current and voltage values provided by the current feedback module and the voltage feedback module through a PID algorithm, and is transformed by the SiC primary inverter drive module and the SiC secondary inverter drive module into a PWM analog drive signal suitable for SiC IGBT modules to realize ultra-high frequency drive modulation to obtain the required accurate current and voltage waveforms; the high-voltage arc stabilization circuit rectifies and filters the high-voltage AC to generate high-voltage DC through the tubular ceramic resistor and loads it on the negative pole of the output terminal. When the current changes from positive to negative, it gives the electric arc space a reverse high voltage to stabilize the arc; with the above operation, the variable-polarity welding power source of the present invention may accurately control the heat input of the welding electric arc, and achieve the processing effect of stable electric arc, near zero spatter, and high-quality welds.

The above-mentioned embodiments are preferred embodiments of the present invention, but the embodiments of the present invention are not limited by the above-mentioned embodiments, and any other changes, modifications, substitutions, combinations, simplification made without departing from the spirit and principle of the present invention, all should be equivalent replacement methods, and they are all included in the protection scope of the present invention.

The invention claimed is:

1. A digital variable-polarity welding power source based on SiC IGBT (Silicon Carbide Insulated Gate Bipolar Transistor), comprising a main circuit and a control circuit, wherein:

the main circuit comprises a three-phase rectifying and filtering circuit, a SiC IGBT primary inverter circuit, a high-frequency transformer, a SiC ultra-high-frequency rectifying and filtering output circuit, a SiC IGBT secondary inverter circuit and a high-voltage arc stabilization circuit connected in sequence, wherein the three-phase rectifying and filtering circuit is connected to a three-phase AC power supply, and the high-voltage arc stabilization circuit is connected to a load; and the control circuit comprises a controller and a power supply control module, and a digital panel, a SiC primary inverter drive module, and a SiC secondary inverter drive module connected in signal respectively to the controller; the digital panel, the SiC primary inverter drive module, and the SiC secondary inverter drive module are electrically connected respectively to the power supply control module; the SiC primary inverter drive module is also connected to the SiC IGBT primary inverter circuit; and the SiC secondary inverter drive module is also connected with the SiC IGBT secondary inverter circuit.

2. The digital variable-polarity welding power supply based on SiC IGBT according to claim 1, wherein:

the three-phase rectifying and filtering circuit comprises a three-phase rectifier module (BR101) and an LC filter module connected in phase; the SiC IGBT primary inverter circuit comprises a SiC IGBT module (TR101), a SiC IGBT module (TR102) and an RC absorption protection circuit; the SiC ultra-high-frequency rectifying and filtering output circuit comprises a SiC diode (D101), a SiC diode (D102), a SiC diode (D103), a SiC diode (D104) and a filter protection circuit; the SiC diode (D102) and the SiC diode (D104) are connected in series and then connected in parallel to a series circuit comprises the SiC diode (D101) and the SiC diode (D103); and the SiC IGBT secondary inverter circuit comprises a SiC IGBT module TR103, a SiC IGBT module (TR104) and an RCD absorption protection circuit; the high-voltage arc stabilization circuit comprises a diode (D105), a diode (D108), a tube-shaped ceramic resistor (R117), an output filtering inductor (L102), and a high-frequency coupling inductor (T102);

the SiC IGBT module (TR101) and the SiC IGBT module (TR102) are connected respectively in parallel to the LC filter module; and a primary of the high-frequency transformer is connected respectively to the SiC IGBT module (TR101) and the SiC IGBT module (TR102), and a first secondary output terminal of the high-frequency transformer is connected to a connection point of the SiC diode (D101) and the SiC diode (D103), and a third secondary output terminal of the high-frequency transformer is connected to a connection point of the SiC diode (D102) and the SiC diode (D104);

the SiC IGBT module (TR103) and the SiC IGBT module (TR104) are connected respectively in parallel to the series circuit comprises the SiC diode (D101) and the SiC diode (D103); the SiC IGBT module (TR103) is also connected to the high-frequency coupling inductance (T102) through the diode (D105), the diode (D108), the tube-shaped ceramic resistor (R117) and the output filtering inductance (L102) connected in sequence; the second secondary output terminal of the high frequency transformer is connected to a connection point of the tubular ceramic resistor (R117) and the output filtering inductance (L102); the SiC IGBT module (TR103) is connected to a positive pole of the load; the high-frequency coupling inductor (T102) is connected to a negative pole of the load; and an output bypass filter circuit is also connected between the connection point of the tubular ceramic resistor (R117) and the output filter inductance (L102) and the positive pole of the load; and the SiC IGBT module (TR101) and the SiC IGBT module (TR102) are connected respectively to the SiC primary inverter drive module; and the SiC IGBT module (TR 103) and the SiC IGBT module (TR104) are connected respectively to the SiC secondary inverter drive module.

3. The digital variable-polarity welding power supply based on SiC IGBT according to claim 1, wherein the SiC primary inverter drive module comprises a first push-pull output circuit comprises a resistor (R201), a resistor (R202), a P-channel power field effect tube (M201), and an N-channel power FET (M202), a second push-pull output circuit comprises a resistor (R203), a resistor (R204), a P-channel power FET (M203) and N-channel power FET (204), and a high-frequency pulse transformer (T201), a high-frequency pulse transformer (T202), and a four-way drive signal generating circuit.

4. The digital variable-polarity welding power supply based on SiC IGBT according to claim 1, wherein the SiC secondary inverter drive module comprises an optocoupler (U301), an optocoupler (U302), a Zener diode (D301), and a Zener diode (D302), a gate drive resistor (R302), a gate drive resistor (R305), a varistor (R303) and a varistor (R306).

5. The digital variable-polarity welding power source based on SiC IGBT according to claim 1, wherein the power supply control module comprises a wave filtering and surge limiting unit, a rectifying and filtering unit, a flyback converter and a number of voltage stabilization modules connected in sequence, and a drive unit connected to the flyback converter.

6. The digital variable-polarity welding power source based on SiC IGBT according to claim 1, wherein the control circuit further comprises:
 a current feedback module used to sample and feedback an output welding current to the controller for a PID adjustment to complete a constant current output control;
 a voltage feedback module used to sample and feedback an output welding voltage to the controller for a PID adjustment to complete a constant voltage output control;
 a switch module used to output a switch signal generated by the controller;
 an anomaly detection and protection circuit used to monitor and determine a working state of the welding power source in real-time and to protect;
 a digital panel connected to the controller through a CAN communication interface used to complete a real-time display of a welding parameter setting and welding current and voltage; and
 the current feedback module, the voltage feedback module, and the switch module are connected respectively to the controller; the controller is used to generate a digital PWM signal by comparing welding parameters set by the digital panel with current and voltage values provided by the current feedback module and the voltage feedback module.

7. The digital variable-polarity welding power source based on SiC IGBT according to claim 6, wherein the abnormality detection protection circuit comprises an overcurrent protection circuit, an under-voltage and over-voltage protection circuit.

8. The digital variable-polarity welding power supply based on SiC IGBT according to claim 7, wherein the overcurrent protection circuit comprises a rectifier (D401), a rectifier (D402), a rectifier (D403), a rectifier (D404), a resistor (R401), a capacitor (C401), and a comparator (U401), a high-speed optocoupler (U402), an optocoupler (U403) and an optocoupler (U404).

9. The digital variable-polarity welding power supply based on SiC IGBT according to claim 7, wherein the under-voltage and over-voltage protection circuit comprises a voltage dividing circuit comprises a voltage dividing resistor (R501), a voltage dividing resistor (R502), a voltage dividing resistor R503, and a voltage dividing resistor (R504), and a comparator (U501).

10. The digital variable-polarity welding power source based on SiC IGBT according to claim 1, wherein the controller comprises a high-performance DSC microprocessor based on an ARM Cortex-M4 core.

* * * * *